(No Model.)
C. P. DICKERT & E. McD. HELLER.
IMPLEMENT FOR SIDING AND THINNING COTTON.
No. 255,258. Patented Mar. 21, 1882.
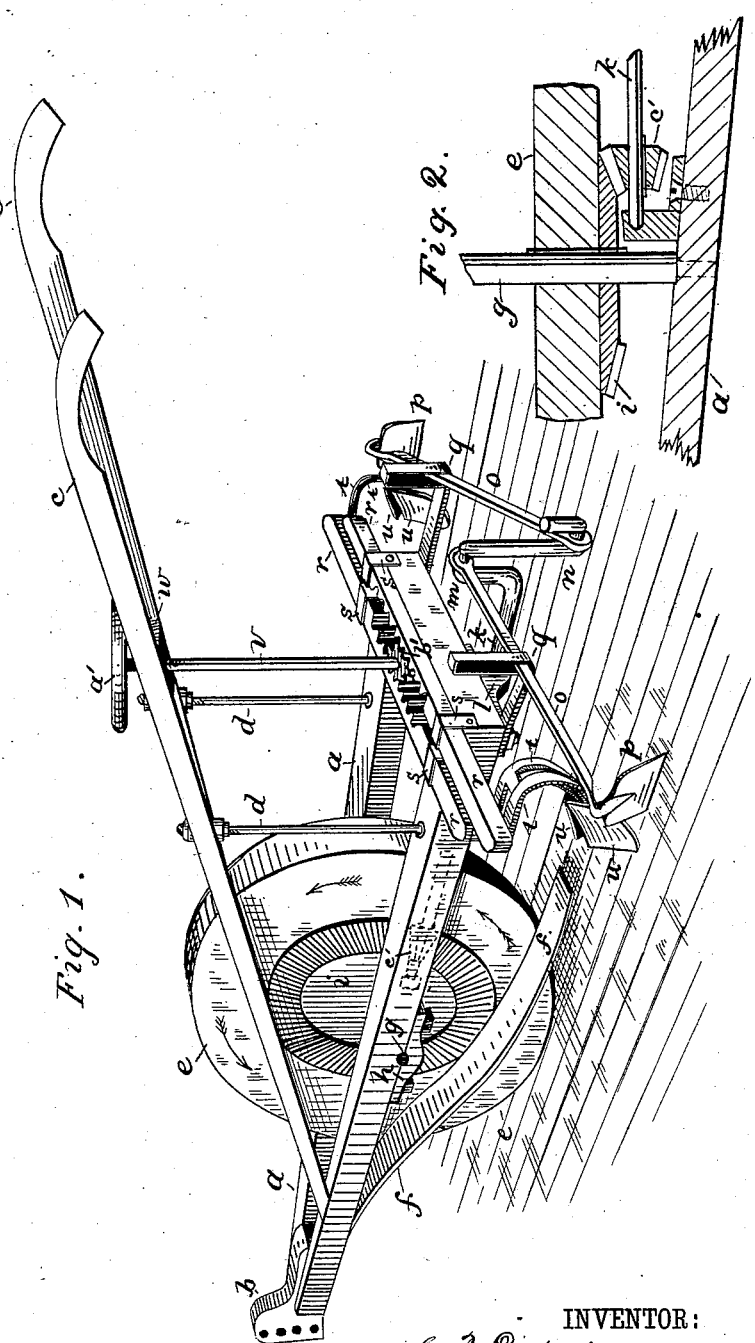
WITNESSES:
INVENTOR:
C. P. Dickert
E. McD. Heller
BY
ATTORNEYS.

UNITED STATES PATENT OFFICE.

CHARLES P. DICKERT AND EMANUEL McD. HELLER, OF WALTON, S. C.

IMPLEMENT FOR SIDING AND THINNING COTTON.

SPECIFICATION forming part of Letters Patent No. 255,258, dated March 21, 1882.

Application filed September 24, 1881. (No model.)

*To all whom it may concern:*

Be it known that we, CHARLES P. DICKERT and EMANUEL McD. HELLER, of Walton, in the county of Newberry and State of South Carolina, have invented a new and useful Improvement in Implements for Siding and Thinning Cotton-Plants; and we do hereby declare that the following is a full, clear, and exact description of the same, reference being had to the accompanying drawings, forming part of this specification, in which—

Figure 1 is a perspective view of our improved implement for siding and thinning cotton-plants, and Fig. 2 is a detail view.

The object of our invention is to furnish an implement that will scrape both sides of two cotton-rows at the same time or both sides of one cotton-row and also thin or chop out the cotton-plants between the plants to be left standing and at the same time allow the scrapers to be laterally adjusted while the implement is in motion to adapt them to conform to the irregularities in width between the cotton-rows, which are never perfectly straight; and to these ends our invention consists of a rigid frame provi 'ed with a supporting-wheel and carrying two parallel horizontal rack-bars, each having at one end two standards provided with inclined scrapers, each pair of which straddles the plants of a row in their forward movement and scrapes its sides, a reciprocating and vertical movement being at the same time imparted to two hoes to thin the plants, the scrapers at the ends of the rack-bars being adapted to be adjusted laterally to conform with the rows by means of a hand-wheel on the upper end of a vertical shaft carrying a cog-wheel at its lower end, which engages with the teeth of the rack-bars, whereby the rack-bars carrying the scrapers may be adjusted laterally while the implement is in motion, as hereinafter more fully set forth.

In the accompanying drawings, $a$ represents a triangular frame, provided with a clevis, $b$, at its forward end.

$c\ c$ represent the handles of the implement, having their forward ends mortised into the side bars of the triangular frame, and provided with the supporting-rods $d$.

$e$ represents a driving and supporting-wheel arranged between the side of the triangular frame $a$, and provided with an axle $g$, having its bearings in the boxes $h$, secured to the lower faces of the sides of the triangular frame.

$f\,f$ represent springs, secured at their upper ends to the under faces of the sides of the triangular frame $a$, near their forward ends, the opposite or free ends of the springs resting on the ground and supporting the frame and the devices carried by it.

$i$ represents a circular bevel-gear, secured to one of the faces of the driving-wheel.

$k$ represents a shaft provided with a bevel-pinion, $e'$, at its forward end, which engages with the bevel-gear $i$ on the driving-wheel $e$. The forward end of the shaft $k$ is supported and turns in an arm projecting from the inner face of one of the sides of the triangular frame $a$, and the rear end of the shaft $k$ is supported and turns in a box, $l$, secured to the under face of the transverse bar of the triangular frame $a$. The rear end of the shaft $k$ is provided with the double cranks $m\ n$, to which are pivoted the ends of the handles $o\ o'$ of the hoes $p\ p'$, which project on opposite sides of the machine.

$q\ q$ represent vertical guides secured to the triangular frame, through which the hoe-handles $o\ o'$ respectively pass, the handles being guided thereby in the reciprocating and vertical movements imparted to them in the revolution of the double crank-shaft $k$. By this construction, in the forward movement of the machine the shaft $k$ is revolved, and by reason of the double cranks the hoes are operated, and the plants between those to be left standing in the rows are chopped or thinned out, so as to leave a proper stand of cotton-plants in the two rows.

The devices for scraping the sides of two rows at the same time, and for laterally adjusting the scrapers to conform with the irregularities in the width between the rows, we will now proceed to describe.

$r\ r$ represent two parallel rack-bars, resting on the upper face of the triangular frame near its rear end, and adapted to slide laterally in the guides $s\ s$. The guides $s$ are formed of straps of metal, each secured at its forward end to the upper face of one of the sides of the triangular frame $a$ near the front face of the forward rack-bar. The strap is then bent angularly around the front face, top, and back face of the front rack-bar, and secured to the top face of the triangular frame, and is then similarly bent around the other rack-bar, thus forming guides for the rack-bars in their lateral reciprocation, as will be presently described.

To one of the ends of each rack-bar, and on opposite sides of the machine, are secured the curved standards $t\ t$, there being two such standards on one of the ends of each rack-bar, each pair of standards lying on opposite sides of the machine and on different rack-bars. The lower parts of the standards are inclined in opposite directions and are provided with scrapers $u$, each pair of scrapers being adapted in the forward movement of the machine to scrape both sides of a row, there being a space left between the scrapers of each pair for the plants to pass through in the forward movement of the machine.

If it is desired, the scrapers may be removed from the standards on one of the rack-bars, so that the two sides of one row only will be scraped in the forward movement of the machine.

$v$ represents a vertical shaft, journaled in a transverse bar, $w$, connecting the handles $c$ of the implement near the plowman, and provided at its upper end with a hand-wheel, $a'$, and at its lower end with a cog-wheel, $b'$, which gears with the teeth of both rack-bars, and by means of which the plowman can adjust laterally the scrapers in the forward movement of the machine to conform with the irregularities in width between the rows, and so that the plants shall pass through the openings between the scrapers and not be injured thereby, the hoes operating at the same time to thin or chop out the plants between those to be left standing.

It will be observed that the hoes have a reciprocating and vertical movement in the process of hoeing, and that the double cranks, to which the ends of their handles are pivoted, are formed on the same revolving shaft, so that as one hoe moves inward and downward the other hoe moves in an opposite direction.

We are aware that a triangular cultivator-frame having its inclined side bars provided with teeth arranged along it, and both side bars hinged at their forward ends to a short transverse plate or bar secured to the central longitudinal bar of the cultivator-frame, has heretofore been employed, the hinged side bars being adapted to be adjusted laterally, as desired, while the cultivator is in motion by means of a pinion operated by the driver and meshing with rack-bars secured to the side bars of the cultivator; and we therefore lay no claim to such construction, which is incapable of scraping both sides of a row of cotton at the same time. In our invention the scraper-frame is rigid, and has not its longitudinal sides pivoted to the central bar, as in the invention disclaimed, and the teeth are arranged on the ends of the rack-bars, and not on the frame, and straddle the plants.

We claim as our invention—

1. The combination, with a rigid wheel-frame carrying two transverse laterally-adjustable bars, each provided with a pair of scrapers on its outer end, the pairs of scrapers lying on opposite sides of the frame, of mechanism, substantially as described, for laterally adjusting the bars, as set forth.

2. The combination, with a rigid wheel-frame carrying two transverse laterally-adjustable bars, each provided with a pair of scrapers, arranged as set forth, and means, substantially as described, for laterally adjusting said bars, of mechanism, substantially as described, for operating two hoes on the same shaft for thinning out the plants, as set forth.

3. The combination, with the driving-wheel $e$, provided with the circular bevel-gear $i$, and the shaft $k$, provided with the bevel-pinion $c'$ and double cranks $m\ n$, of the handles $o\ o'$, pivoted respectively to the double cranks, hoes $p\ p'$, and guides $q\ q$, substantially as described, and for the purpose set forth.

4. The combination of the frame $a$, laterally-adjustable rack-bars $r$, provided with scrapers $u$, shaft $v$, provided with hand-wheel $a'$, and cog-gear $b'$, driving-wheel $e$, having bevel-gear $i$, shaft $k$, provided with bevel-pinion $c'$, and double cranks $m\ n$, handles $o\ o'$, hoes $p\ p'$, and guides $q$, substantially as described, and for the purpose set forth.

The above specification of our invention signed by us in the presence of two subscribing witnesses.

CHARLES P. DICKERT.
EMANUEL McDUFFIE HELLER.

Witnesses as to the signature of Dickert:
SOLON C. KEMON,
CHAS. A. PETTIT.
Witnesses as to the signature of Heller:
D. A. DICKERT,
JAMES W. CROMER.